(12) United States Patent
Artsiely et al.

(10) Patent No.: US 9,086,177 B2
(45) Date of Patent: Jul. 21, 2015

(54) JOINTED BRIDGE FOR CLAMP ASSEMBLY

(71) Applicants: Eyal Artsiely, Arvot Hayarden (IL); Avi Chiproot, Kfar-Saba (IL)

(72) Inventors: Eyal Artsiely, Arvot Hayarden (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 220 days.

(21) Appl. No.: 13/716,249

(22) Filed: Dec. 17, 2012

(65) Prior Publication Data
US 2014/0167409 A1    Jun. 19, 2014

(51) Int. Cl.
*F16L 21/06* (2006.01)
*F16L 33/035* (2006.01)

(52) U.S. Cl.
CPC .............. *F16L 21/06* (2013.01); *F16L 33/035* (2013.01)

(58) Field of Classification Search
CPC ........ F16L 21/06; F16L 21/065; F16L 33/035
USPC .............................. 63/3.2, 5.1, 6, 9
See application file for complete search history.

(56) References Cited

U.S. PATENT DOCUMENTS

| 5,188,401 | A  | * | 2/1993  | Staniforth ..................... 285/322 |
| 6,467,307 | B1 | * | 10/2002 | Watson ................................ 63/3 |
| 7,571,940 | B2 | * | 8/2009  | Krausz et al. ................. 285/421 |
| 8,505,985 | B2 | * | 8/2013  | Nijsen et al. .................. 285/421 |
| 2009/0160183 | A1 | * | 6/2009 | Felber ...................... 285/148.26 |

* cited by examiner

*Primary Examiner* — James Hewitt
(74) *Attorney, Agent, or Firm* — Dekel Patent Ltd.; David Klein

(57) ABSTRACT

An accessory for a clamp assembly including a clamp bridge including a plurality of curved bridge elements attached to one another by a joint that permits relative motion between neighboring bridge elements.

7 Claims, 4 Drawing Sheets

JOINTED BRIDGE FOR CLAMP ASSEMBLY

FIELD OF THE INVENTION

The present invention relates generally to clamps, couplings and grip rings for pipes, and particularly to a jointed bridge which can be used in tightening such clamps around pipes of the same or different diameters.

BACKGROUND OF THE INVENTION

Many kinds of removable band-type clamps or couplings (referred to herein as clamps, and the terms being used interchangeably) for pipes exist in the art. It is noted that throughout the specification and claims, the term "pipe" encompasses any kind of generally cylindrical object.

Couplings for connecting pipes of the same or different diameters are known, an example of which is shown in FIG. 1. A clamp or coupling 1 has a ring shaped seal 2 made of rubber or other resilient material, which may be constructed of a first ring seal seated over a second ring seal. The seals can be easily disconnecting from one another to allow sealing against different diameter pipes. For smaller diameter pipes, both the first and second ring seals are used; for larger diameters, only one seal is used. FIG. 1 shows coupling 1 clamped against two pipes 3 and 4.

The clamp 1 typically includes a circumferentially continuous band 5 that has two ends separated by a gap. Typically, clamping members 6 are secured to the ends of band 5. One or more tightening fasteners 7 are used to tighten the two clamping members 6 to each other and effect the seal on the pipe.

It is known to use a spanning element, known as a bridge or clamp bridge 8, in such couplings, shown in FIG. 2. The bridge 8 spans the abovementioned gap located at the tightening mechanism. The bridge helps keep the sealing rings in place when tightening the clamp.

A problem, however, can occur with prior art bridges, which are made of a single piece of metal, typically stainless steel. If two pipes of different diameters are used, as seen in FIG. 3, one end 8A of the bridge 8 is tightened against a different diameter than the other end 8B of the bridge 8. The causes the bridge 8 to distort and can cause the bridge 8 to dig in and damage the seal 2 and/or part of the coupling body.

SUMMARY OF THE INVENTION

The present invention seeks to provide an improved bridge for a clamp assembly, wherein the bridge is jointed and can thus withstand tightening forces on different diameter pipes without causing damage to the seals or coupling.

There is thus provided in accordance with an embodiment of the present invention an accessory for a clamp assembly including a clamp bridge including a plurality of curved (e.g., partially cylindrically shaped) bridge elements attached to one another by a joint that permits relative motion between neighboring bridge elements.

In accordance with an embodiment of the present invention the joint includes one or more partially circumferential slots formed in the neighboring bridge elements and one or more bands that are received in the one or more slots, the bands being movable in the slots.

In accordance with an embodiment of the present invention the bands are axially and/or circumferentially movable in the slots.

In accordance with an embodiment of the present invention the neighboring bridge elements do not overlap one another throughout movement of the one or more bands in the one or more slots.

There is also provided in accordance with an embodiment of the present invention clamp assembly including an annular clamp having an opening at least one end of its axial length for inserting therein a pipe, the annular clamp including two clamp members, a sealing ring operative to contact an outer contour of the pipe, a fastener operative to fasten the clamp members towards each other so as to apply a radially-inward clamping force on the sealing ring so that the annular clamp clamps the pipe, and a clamp bridge secured to the annular clamp and including a plurality of curved bridge elements attached to one another by a joint that permits relative motion between neighboring bridge elements.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1:
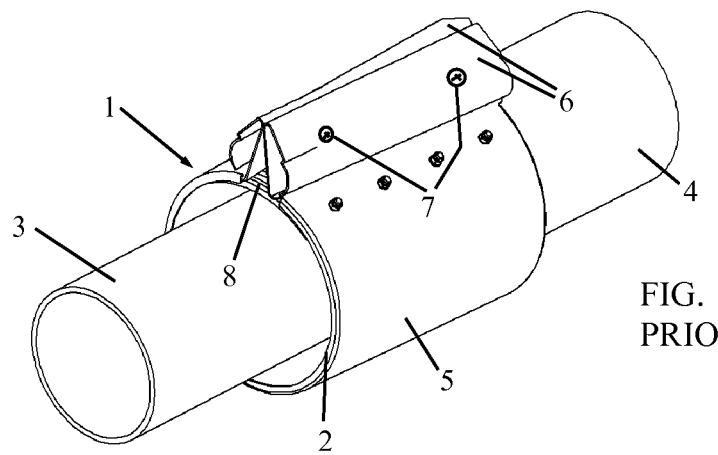
FIG. 1 is a simplified pictorial illustration of a prior art clamp assembly and bridge.
Figure 2:
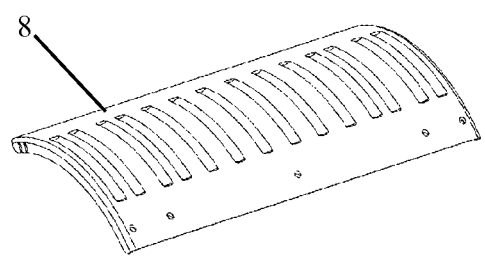
FIG. 2 is a simplified pictorial illustration of the prior art bridge.
Figure 3:
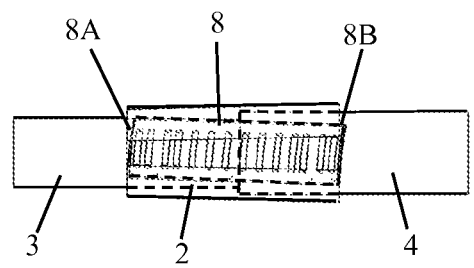
FIG. 3 is a simplified pictorial illustration of the prior art bridge distorted and damaging a seal and/or coupling.
Figure 4:
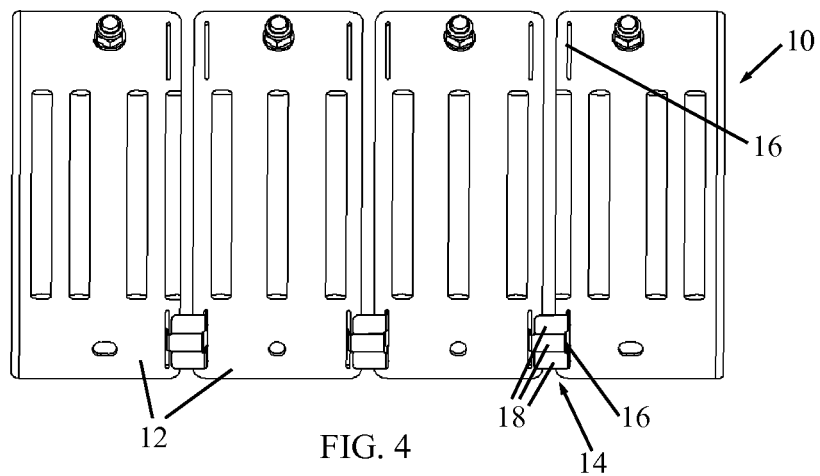
FIGS. 4 and 5 are simplified pictorial illustrations of a clamp bridge, constructed and operative in accordance with an embodiment of the present invention, respectively before and after application of distorting forces on the bridge.
Figure 5:
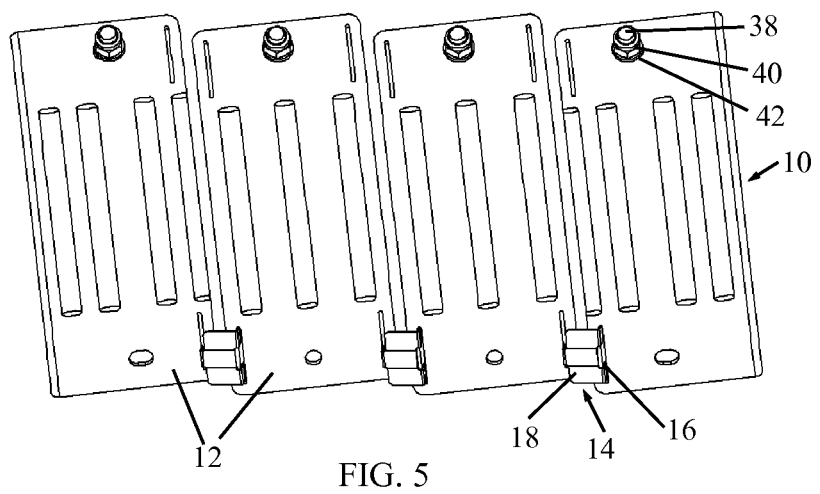

Reference is now made to FIGS. 4 and 5, which illustrate a clamp bridge 10 (bridge 10, for short), constructed and operative in accordance with a non-limiting embodiment of the present invention.

Bridge 10 may be made of a suitably strong, yet bendable material, such as but not limited to, stainless steel (e.g., AISI 304). Bridge 10 includes a plurality of curved (e.g., partially cylindrically shaped) bridge elements 12 attached to one another by a joint 14 that permits relative motion between neighboring bridge elements 12.

In accordance with an embodiment of the present invention, joint 14 includes one or more partially circumferential slots 16 formed in the neighboring bridge elements 12 and one or more bands 18 that are received in slots 16. "Circumferential" refers to the direction along the periphery of the bridge 10 "orbiting" about an imaginary longitudinal axis 19 of the pipes being clamped (see FIG. 6 or 8). Bands 18 may be bent members with legs or ring members and the like that fit into slots 16.

Bands 18 are axially (i.e., in the longitudinal direction) and/or circumferentially movable in slots 16. For example, as seen in FIG. 5, after application of distorting forces on bridge elements 12 (such as due to tightening forces on pipes of different diameters), bands 18 have moved both axially and circumferentially in slots 16. Other joints may be employed, such as but not limited to, pins in elongated holes, riveted connections in oversize holes and others.

Figure 6:
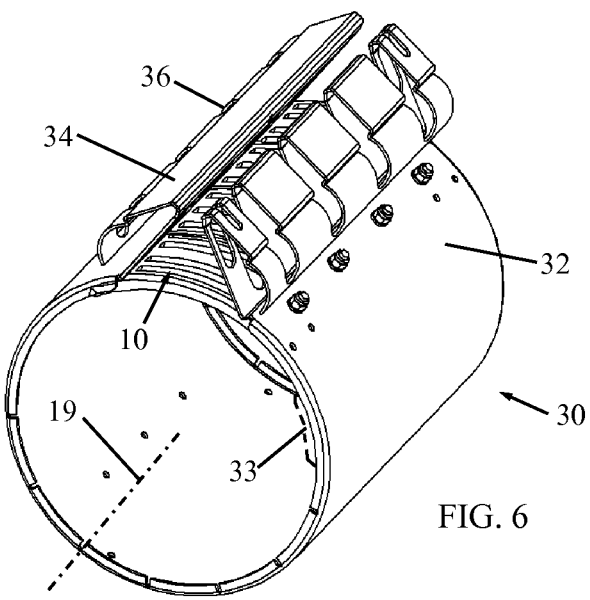
FIG. 6 is a simplified pictorial illustration of a clamp assembly with the bridge of FIGS. 4 and 5 installed therein, constructed and operative in accordance with an embodiment of the present invention.
Figure 7:
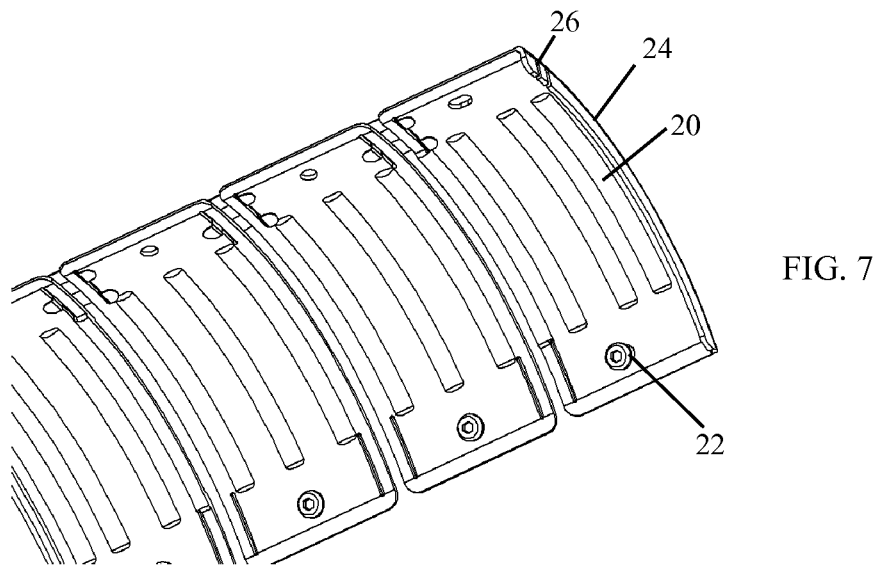
FIG. 7 is a simplified pictorial illustration of the underside of the bridge.

Referring to FIG. 7, it is seen that each bridge element 12 may be formed with partially circumferential grooves 20 and one or more mounting holes 22 for mounting bridge element 12 in the clamp assembly 30 of FIG. 6, described below. The end bridge element may be formed with a side wall 24, which has a plurality of notches 26 formed therein. Notches 26 provide flexibility to the lower part of bridge element 12.

Reference is now made to FIG. 6, which illustrates a clamp assembly 30 with the bridge 10 installed therein, constructed and operative in accordance with an embodiment of the present invention.

The clamp assembly 30 includes a circumferentially continuous band 32 that has two ends separated by a gap. Band 32 goes around a seal 33 (shown partially in broken lines). Clamping members 34 are secured to the ends of band 32. One or more tightening fasteners 36 (shown partially) are used to tighten the two clamping members 34 to each other and effect a seal on pipes (seen in FIG. 8). Bridge elements 12 may be fastened to band 32 by means of a mechanical fastener, such as bolts 38, which may be secured by a nut 40 and lock washer 42 (FIG. 4).

The clamp assembly 30 is tightened by tightening fasteners 36, which fasten the clamping members 34 towards each other in a direction transverse to the longitudinal axis 19 of the assembly so as to apply a radially-inward clamping force on seal 33.

Figure 8:
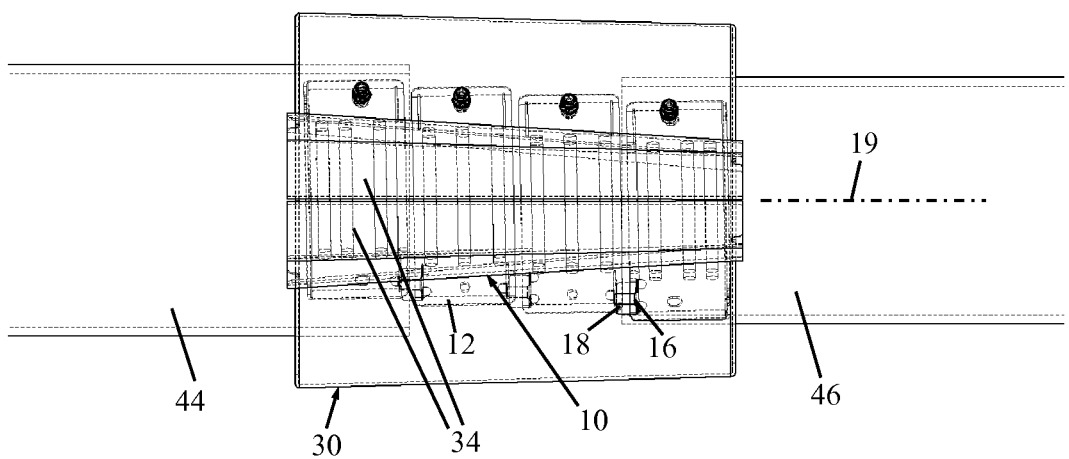
FIG. 8 is a simplified pictorial illustration of the clamp assembly with the bridge, being used to clamp pipes of different diameters, and after application of distorting forces on the bridge, showing there is no damage or distorting forces transferred to the seal or clamp.

Reference is now made to FIG. 8, which illustrates clamp assembly 30 with bridge 10, being used to clamp pipes 44 and 46 of different diameters. After application of distorting forces on bridge 10, bands 18 of bridge elements 12 have moved both axially and circumferentially in slots 16. In this manner, there is no damage or distorting forces transferred to the seal or clamp body. It is noted that in accordance with an embodiment of the present invention the neighboring bridge elements 12 do not overlap one another throughout movement of bands 18 in slots 16. This ensures that bridge 10 lies properly over the seal of the clamp.

The scope of the present invention includes both combinations and subcombinations of the features described hereinabove as well as modifications and variations thereof which would occur to a person of skill in the art upon reading the foregoing description and which are not in the prior art.

What is claimed is:

1. A clamp assembly comprising:
a clamp or coupling comprising a seal and a circumferentially continuous band that has two ends separated by a gap;
clamping members secured to the ends of said band;
one or more tightening fasteners operative to tighten the clamping members to each other; and a clamp bridge positioned in and spanning said gap, said clamp bridge comprising a plurality of curved bridge elements attached to one another by a joint that permits relative motion between neighboring bridge elements and wherein said joint comprises one or more partially circumferential slots formed in the neighboring bridge elements and one or more bands that are received in said one or more slots, said bands being movable in said slots.

2. The assembly according to claim 1, wherein said bands are axially movable in said slots.

3. The assembly according to claim 1, wherein said bands are circumferentially movable in said slots.

4. The assembly according to claim 1, wherein the neighboring bridge elements do not overlap one another throughout movement of said one or more bands in said one or more slots.

5. The assembly according to claim 1, wherein each of said bridge elements is formed with partially circumferential grooves and one or more mounting holes for mounting the bridge element in the clamp assembly.

6. A clamp assembly comprising:
an annular clamp having an opening at least one end of its axial length for inserting therein a pipe, said annular clamp comprising two clamp members and a circumferentially continuous band that has two ends separated by a gap;
a sealing ring operative to contact an outer contour of the pipe;
a fastener operative to fasten said clamp members towards each other so as to apply a radially-inward clamping force on said sealing ring so that said annular clamp clamps the pipe; and
a clamp bridge positioned in and spanning said gap, said clamp bridge being secured to said annular clamp and comprising a plurality of curved bridge elements attached to one another by a joint that permits relative motion between neighboring bridge elements and wherein said joint comprises one or more partially circumferential slots formed in the neighboring bridge elements and one or more bands that are received in said one or more slots, said bands being movable in said slots.

7. The assembly according to claim 6, wherein each of said bridge elements is formed with partially circumferential grooves and one or more mounting holes for mounting the bridge element in the clamp assembly.

* * * * *